(12) United States Patent
Henager, Jr. et al.

(10) Patent No.: US 6,277,493 B1
(45) Date of Patent: Aug. 21, 2001

(54) JOINED CERAMIC PRODUCT

(75) Inventors: Charles H. Henager, Jr., Kennewick; John L. Brimhall, West Richland, both of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/257,343

(22) Filed: Feb. 25, 1999

Related U.S. Application Data

(63) Continuation-in-part of application No. 08/799,580, filed on Feb. 12, 1997, now abandoned.

(51) Int. Cl.$^7$ .................................................... B32B 9/04
(52) U.S. Cl. ......................... 428/446; 428/448; 428/698
(58) Field of Search .................................. 428/446, 448, 428/698

(56) References Cited

U.S. PATENT DOCUMENTS

| | | | |
|---|---|---|---|
| 4,925,608 | * 5/1990 | Rossi et al. | 264/60 |
| 4,961,529 | * 10/1990 | Gottselig et al. | 228/124 |
| 5,204,294 | * 4/1993 | Matsumoto | 501/92 |
| 5,462,902 | * 10/1995 | Henager, Jr. et al. | 501/92 |

FOREIGN PATENT DOCUMENTS

| | | |
|---|---|---|
| 0 322 732 | 12/1988 | (EP) . |
| WO 97/16394 | 5/1997 | (WO) . |

OTHER PUBLICATIONS

Morozumi, S., et al., "Bonding mechanism between silicon carbide and thin foils of reactive metals," J. Materials Science, 20 3976–3980, 1985.*
BH Rabin et al., *"Joining of SiC–Based Ceramics by Reaction Bonding Methods"*, pp. 195–201, 1993.
TJ Moore, *"Feasibility Study of the Welding of SiC"*, pp. 151–153, 1985.

* cited by examiner

Primary Examiner—Deborah Jones
Assistant Examiner—Bryant Young
(74) Attorney, Agent, or Firm—Paul W. Zimmerman

(57) ABSTRACT

According to the present invention, a joined product is at least two ceramic parts, specifically bi-element carbide parts with a bond joint therebetween, wherein the bond joint has a metal silicon phase. The bi-element carbide refers to compounds of MC, $M_2C$, $M_4C$ and combinations thereof, where M is a first element and C is carbon. The metal silicon phase may be a metal silicon carbide ternary phase, or a metal silicide.

7 Claims, 2 Drawing Sheets

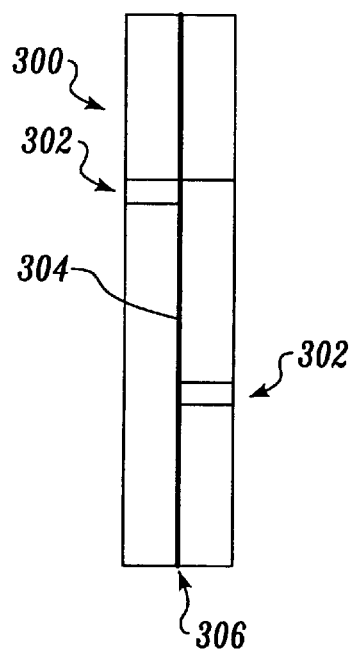
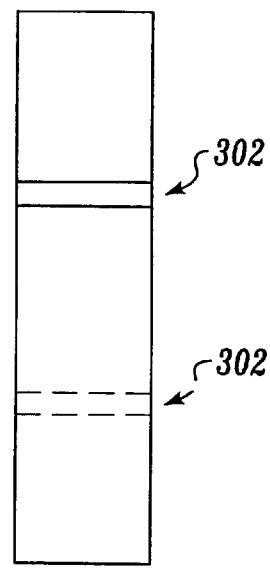
*Fig. 3a*  *Fig. 3b*
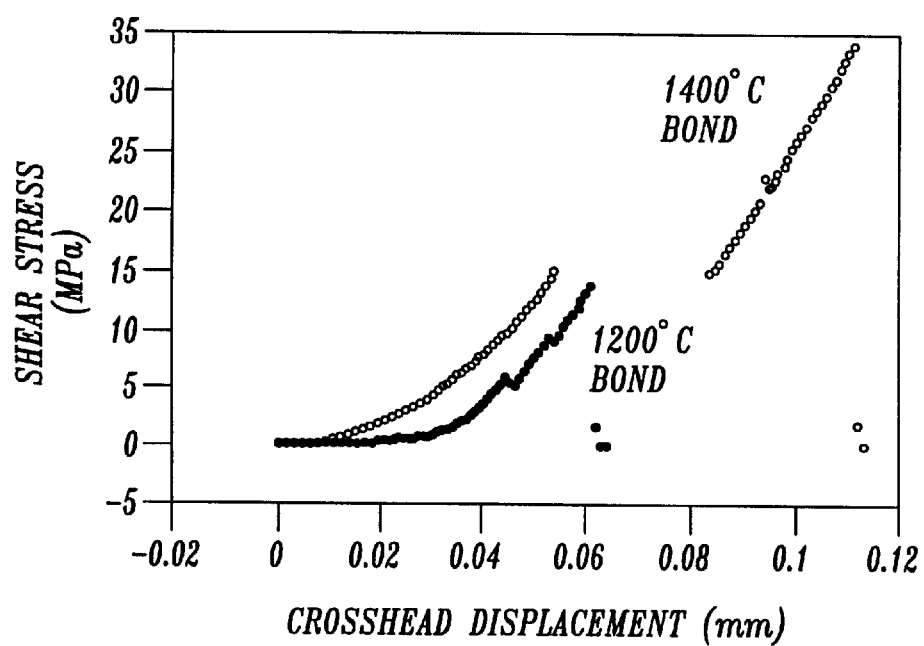
*Fig. 4*

JOINED CERAMIC PRODUCT

CROSS REFERENCE TO RELATED APPLICATION(S)

This application is a continuation-in-part of application Ser. No. 08/799,580, filed Feb. 12, 1997, abandoned.

This invention was made with Government support under Contract DE-AC06 76RLO 1830 awarded by the U.S. Department of Energy. The Government has certain rights in the invention.

FIELD OF THE INVENTION

The present invention relates generally to a joined ceramic product. More specifically, the invention is the joining of ceramics containing carbon by use of a bond agent having a metal carbide and silicon, and reacting the bond agent with the ceramics in a solid state displacement reaction.

BACKGROUND OF THE INVENTION

Displacement reactions are phase transitions wherein two or more elements or compounds in the solid phase react to form new product compounds that are more thermodynamically stable than the starting reactants. The formation of the stable product phases is accompanied by specific morphologies that can give the resultant composite desirable properties. Displacement reactions have been used for making composite materials as described in SYNTHESIS OF A $MoSi_2$—SiC COMPOSITE IN SITU USING A SOLID STATE DISPLACEMENT REACTION, C H Henager, J L Brimhall, J P Hirth, Mat. Sci. and Engr. A155 (1992) 109–114, and for making a film product as discussed in U.S. Pat. No. 5,462,902, as well as in SYNTHESIS OF $Ti_3SiC_2$/SiC AND $TiSi_2$/SiC COMPOSITES USING DISPLACEMENT REACTIONS IN THE Ti—Si—C SYSTEM, R. Radhakrishnan, C H Henager, Jr., J L Brimhall, S B Bhaduri, Scripta Metallurgica, Vol. 34, No. 12, pp. 1809–1814, 1996. However, displacement reactions have not been suggested for any other uses.

Joining of ceramics has been a problem for centuries. Metals can be welded and fastened together, but ceramics cannot be welded and the low fracture toughness of ceramics makes mechanical fastening difficult. The large differences in thermal expansion between metals and ceramics makes dissimilar materials joining a difficult problem, also. Presently, products using ceramics or that require ceramic/metal connections are generally designed to minimize the need to join ceramics. Accordingly, there is a need for a method to join ceramic parts and to join ceramics to metals.

SUMMARY OF THE INVENTION

According to the present invention, a joined product is at least two ceramic parts, specifically bi-element carbide parts with a bond joint therebetween, wherein the bond joint has a metal silicon phase. As used herein, the term 'part' refers to a macroscale 3-dimensional solid object, in any geometry, including but not limited to block, disc, rod, pipe, sphere, cone, and combinations thereof that has a microstructure of a plurality of micro-particulates or grains. As used herein, the term 'bi-element carbide' refers to compounds selected from the group including but not limited to MC, $M_2C$, $M_4C$ and combinations thereof, where M is a first element and C is carbon. The metal silicon phase may be a metal silicon carbide ternary phase, or a metal silicide.

According to the method of the present invention, joining a first bi-element carbide part to a second bi-element carbide part, has the steps of:

(a) forming a bond agent containing a metal carbide and silicon;

(b) placing the bond agent between the first and second bi-element carbide parts as a pre-assembly; and (c) pressing and heating the pre-assembly in a non-oxidizing atmosphere to a temperature effective to induce a displacement reaction creating a metal silicon phase interspersed with a silicon carbide phase bonding the first and second bi-element carbide parts.

It is an object of the present invention to provide a joined ceramic part.

It is a further object of the present invention to provide a method of joining ceramic parts.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3a is a side view of an inter-laminar shear test specimen with a joint.

FIG. 3b is a front view of the inter-laminar shear test specimen with a joint in FIG. 3a.

FIG. 4 is a graph of shear stress versus crosshead displacement for two joints tested. The shear stress was computed by dividing the load by the area between the notches and was not corrected herein for the unbonded area fraction.

DESCRIPTION OF THE PREFERRED EMBODIMENT(S)

The present invention is a joined ceramic product. The joined ceramic product is at least two carbide parts with a bond agent of a metal carbide and silicon therebetween. The method of joining the carbide parts is with a solid state displacement reaction. The carbide is a bi-element carbide having the form of MC, $M_2C$, $M_4C$ and combinations thereof, where M is a first element and C is carbon. The metal silicon phase may be a metal silicon carbide ternary phase, or a metal silicide. More specifically, M may be a metal from the group including but not limited to IVB, VB, VIB of the periodic table of the elements, or a metalloid including but not limited to silicon, and boron and combinations thereof. In a preferred embodiment of the present invention, M is selected from the group consisting of Ti, V, Mo, Hf, Zr, Nb, Ta, Cr, W, silicon, boron and combinations thereof.

The bi-element carbide may be a composite bi-element carbide wherein the bi-element carbide comprises the matrix phase of the composite and a ceramic fiber, ceramic whisker, or ceramic particle comprises the reinforcement phase of the composite. Ceramic fibers can be either continuous, in which case they span the entire dimension of the composite material, or discontinuous. The bi-element carbide matrix phase is typically formed by either vapor deposition, commonly referred to as chemical vapor infiltration, or from polymer precursors, commonly referred to as a polymer impregnation process. An example of such a bi-element carbide composite is that consisting of —SiC matrix phase containing continuous SiC-like fibers, such as Nicalon™ fibers or others.

Figure 1:
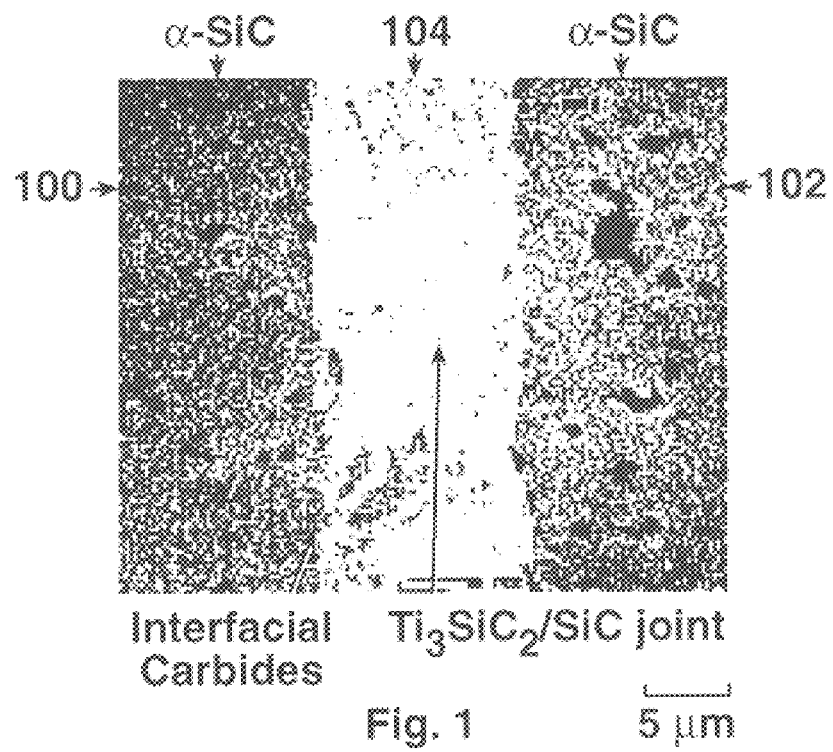
FIG. 1 is a photo micrograph of a joint between —SiC and $Ti_3SiC_2$+SiC joint processed at 1400 C and formed during solid state displacement reaction between TiC and Si using blended and tape-cast powders 100 μm starting thickness.
Figure 2:
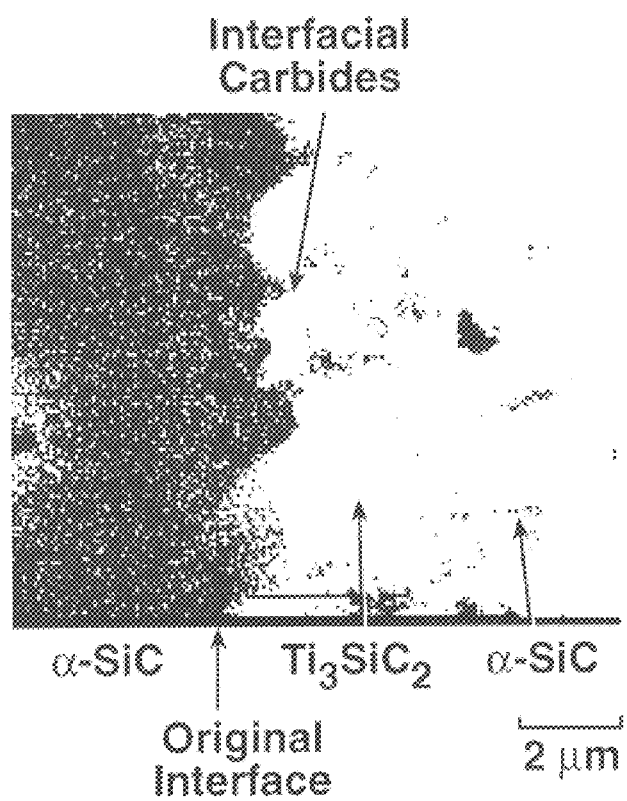
FIG. 2 is a photo micrograph of a joint interface between —SiC and $Ti_3SiC_2$+SiC joint processed at 1400 C during displacement reaction between TiC and Si showing interfacial carbides and location of original interface.

The formation of intermetallic/ceramic composite microstructures from solid state displacement reactions between metal carbides and silicon forms strong, tough joints between carbide-based ceramics. Referring to FIG. 1, a first bi-element part 100 and a second bi-element part 102 have a bond agent 104 therebetween. The bond agent 104 interacts with the first and second bi-element parts 100, 102 via solid state displacement reaction. While displacement reactions can produce a wide variety of microstructures, the most likely one to form is a particulate-type microstructure where one of the phases is continuous and the second phase is discontinuous and dispersed within the first phase. The formation of these microstructures occurs by a reaction sequence consisting of interdiffusion, nucleation, and growth at specific moving boundaries (note FIG. 2, Original Interface) in these ternary systems where carbon accumulates. The bond agent 104 contains a metal carbide and silicon. Upon solid state displacement reaction, the bond agent 104 is transformed into a metal suicide and silicon carbide, whereas the first and second bi-element parts 104 remain substantially unchanged in microstructure except at the part/bond-agent interface where the bond occurs.

According to the method of the present invention, joining a first bi-element carbide part to a second bi-element carbide part, has the steps of:

(a) forming a bond agent containing a metal carbide and silicon;

(b) placing the bond agent between the first and second bi-element carbide parts as a pre-assembly;

(c) pressing and heating the pre-assembly in a non-oxidizing atmosphere to a temperature effective to induce a solid state displacement reaction creating a metal silicon phase interspersed with a silicon carbide phase bonding the first and second bi-element carbide parts.

Using solid state displacement reactions to bond ceramic parts exploits the phenomena that the solid state displacement reaction produces a phase that is in equilibrium or otherwise compatible with the materials bonded. For example, a metal carbide (TiC) is reacted with Si to form a metal-silicon-carbide ($Ti_3SiC_2$) and SiC. The production of SiC during the reaction is responsible for the strong bonding that occurs. In another example, Si reacts with $Mo_2C$ to form $Mo_5Si_3C$, then reacts with $Mo_5Si_3C$ to form $MoSi_2$. It was observed that SiC formed at the interface between $MoSi_2$ and $Mo_5Si_3C$ and within the $Mo_5Si_3C$ phase. During the reaction as Si continues to interdiffuse this interface moves in the direction of the Si flux and gradually entrains the SiC particles into the $MoSi_2$ phase. It is apparent from the micrographs of this reaction sequence that the SiC phase forms by nucleation at this moving boundary as discrete SiC particles. Crystallography and/or strain energy considerations may dictate the SiC morphology as it forms. However, the presence of a pre-existing SiC surface, as is the case with the tape-cast powders sandwiched between the pieces of —SiC, provides a preferential site for SiC nucleation and a strong bond forms between the reaction products and pre-existing SiC during the reaction and subsequent densification. Joints produced according to the present invention have the advantage that reactions occur in the solid state at lower temperatures compared to reaction infiltration methods, such as reaction bonded silicon carbide joining methods which requires infiltration by liquid Si. However, solid state reactions require longer times compared to liquid infiltration reactions and also require some applied pressure to accommodate specific volume changes and for densification.

Solid state displacement reactions may occur at temperatures from about 800° C. to about 1500° C., preferably from about 1200° C. to about 1450° C. Silicon melts at about 1410° C. Thus, it is preferred to avoid melting the silicon and making bonds at temperatures of about 1400° C. or less.

The amount of pressure used to hold the parts together and provide a joint is related to the temperature. For a given joint strength, a lower temperature requires a higher pressure. Generally, the pressure may range from about 0.5 Mpa (5 atm). For ease of making a joint, the pressure is preferably as low as possible. However, where joint strength is the driving factor, preferred pressures are at least about 15 MPa (2,000 psi). A practical range of pressure is about 15 MPa to 30 MPa, but the upper limit depends upon the material and fixture design. The best joints (strongest joints) have been made with a pressure of 45 MPa with temperatures from 1350° C. to 1500° C.

EXAMPLE 1

An experiment was conducted to demonstrate bonding of two carbide parts.

The two bi-element carbide parts were two pieces of Hexaloy —SiC approximately 2.54 cm long by 0.64 cm wide and 0.32 cm thick. The bond agent was a mixture of TiC (99.5% purity, d 44 $\mu$m) and Si (99.9% purity, d 44 $\mu$m) powders (approximately 3:2 mole ratio) that was tape cast into thin layers 100 $\mu$m thick, and de-bindered in flowing argon gas at 400° C. A ceramic alignment fixture was used to align the two pieces of Hexaloy with the thin layer (100 $\mu$m thick) of de-bindered bond agent in between forming the pre-assembly. The de-bindered tape was brittle, however, and fractured as it was being placed in between the —SiC pieces. Therefore, a uniform tape-cast layer over the entire joint area was not obtained in this experiment.

This pre-assembly was placed in a Instron (Canton, Mass.) test frame equipped with a split clamshell furnace with $MoSi_2$-heating elements and inside a sealed alumina tube filled with purified flowing argon gas. The joint assembly was heated to either 1400° C. or 1200° C. and held for 30 minutes at 20 MPa pressure by applying a compressive load of 3360 Newtons (750 pounds) on the ceramic alignment fixture. After cooling, the now joined assembly was either sectioned for examination of the joint or cut into inter-laminar shear test specimens for strength testing.

Sectioned and polished joints (FIGS. 1 and 2) revealed that SiC had indeed been formed preferentially at the —SiC/TiC+Si tape boundary. The microstructure of the joint interior was observed to consist of a continuous $Ti_3SiC_2$ metal silicon ternary phase interspersed with a high-aspect ratio SiC (silicon carbide) phase and a blocky SiC (silicon carbide) phase. This material was characterized by an indentation fracture toughness of 9.5 MPa m and a Vickers hardness of 8 GPa. The presence of the interfacial-SiC grown onto the Hexaloy —SiC can be most clearly seen in FIG. 2 corresponding to a strong bond formed between the two materials.

An inter-laminar shear test based on ASTM D 695, was used to characterize the joints for mechanical strength using a shear test specimen 300 (see FIGS. 3a and 3b). The shear test specimen 300 had two opposing notches 302 cut into opposite faces of the shear test specimen 300 such that the two notches 302 were at different heights along the joint 304 but intersected the joint 304 along the specimen mid-plane 306. This shear test specimen 300 was then placed into compression along its long axis 306 and a region of shear stress develops between the two notches 302 such that specimen failure occurs along the joint plane 306 between the two notches 302. The cross-sectional area between the notches 302 is used to compute the shear strength from the applied load at failure.

Two joints were tested in this manner to obtain a stress versus displacement curve FIG. 4 and these results, together with optical micrographs of the fracture surfaces, indicate that strong bonding did occur at the —SiC/TiC+Si interface. The bonding was less strong for the joint processed at 1200° C. Evidence for the strong bonding comes from the measured room temperature shear strength of the joint processed at 1400° C. of about 35 MPa.

Because the de-bindered tape had fractured before being placed between the pieces making the bonding across the entire shear area incomplete, the value of 35 MPa is conservative and, in actuality, a value closer to 50 MPa was estimated by accounting for the unbonded area fraction. Further evidence of high joint strength came from the observation that the fracture path during the shear-type failure passed partly through the —SiC. The presence of the 'dished' fracture surface indicates that fracture occurred below the plane of the joint and in the —SiC piece.

A strong joint was formed between —SiC and itself using a solid state displacement reaction between TiC and Si at temperatures of 1200° C. and 1400° C. A tape-cast powder layer consisting of blended TiC and Si powders was sandwiched between two pieces of —SiC and 20 MPa applied pressure during the reaction resulted in the strong joint. An inter-laminar shear-type test was used to characterize the joint and a room temperature shear strength of about 35–50 MPa was obtained for the joint processed at 1400° C. and about 20 MPa for the one processed at 1200 C.

EXAMPLE 2

An experiment was conducted as in Example 1, except that the bond agent was in a powder form instead of a tape-cast form.

The bond agent was a mixture of TiC (99.5% purity, d≦44 μm) and Si (99.9% purity, d≦44 μm) powders (approximately 3:2 mole ratio) that was uniaxially cold-pressed into layers 500 μm thick.

This pre-assembly was placed in the Instron (Canton, Mass.) test frame and inside the sealed alumina tube filled with purified flowing argon gas. The pre-assembly was heated to 800° C. and a pressure of 15 MPa was applied. The temperature was then raised to 1400° C. and held for 30 minutes at 15 MPa pressure. After cooling, the now joined assembly was sectioned for examination of the joint.

The sectioned and polished joint revealed that, as in Example 1, SiC had indeed been formed preferentially at the —SiC/TiC+Si powder boundary. The microstructure of the joint interior was observed to consist of a continuous $Ti_3SiC_2$ metal silicon ternary phase interspersed with a high-aspect ratio SiC (silicon carbide) phase and a blocky SiC (silicon carbide) phase.

EXAMPLE 3

An experiment was conducted as in Examples 1 and 2 to demonstrate use of an alternative bond agent, $Mo_2C+Si$. This bond agent was in powder form. The two bi-element carbide parts were two pieces of Hexaloy-SiC approximately 2.54 cm long by 0.64 cm wide and 0.32 cm thick. The bond agent was a mixture of $Mo_2C$ (99.5% purity, d≦44 μm) and Si (99.9% purity, d≦44 μm) powders (approximately 1:5 mole ratio) that was uniaxially cold-pressed into layers 500 μm thick.

This pre-assembly was heated to 800° C. and a pressure of 15 MPa was applied. The temperature was then raised to 1400° C. and held for 30 minutes at 15 MPa pressure. After cooling, the now joined assembly was sectioned for examination of the joint.

The sectioned and polished joint revealed that SiC had indeed been formed preferentially at the —SiC/$Mo_2C$+Si powder boundary. The microstructure of the joint interior was observed to consist of a continuous $MoSi_2$ metal silicon phase interspersed with a blocky SiC (silicon carbide) phase.

EXAMPLE 4

An experiment was conducted to demonstrate joining two parts made from a continuous fiber reinforced SiC composite material, specifically Nicalon (Trademark of Ciba-Geigy) ceramic grade fibers woven in a 0/90 plain weave cloth and infiltrated with SiC by chemical vapor deposition.

The bond agent, tape cast TiC+Si powders as in Example 1, was placed between two parts in the form of rectangular solids of the composite material. The bonding temperature was 1200° C. The bonding was sufficiently strong to resist breaking by hand. No microstructural characterization or Instron testing were performed.

EXAMPLE 5

An experiment was conducted to demonstrate joint quality. Joints were prepared as described in Example 1 except that the bond agent was in the form of powder rather than tape cast. Joint construction pressure was 28 MPa (4 ksi) and joint construction temperature was 1350° C. or 1500° C.

Four-point flexural strength test specimens of 3.0×4.0× 50.0 $mm^3$ were prepared from the joint billets by diamond machining. Room-temperature and high-temperature strengths at 1000° C. were measured in air using a self-aligning SiC fixture with a 40-mm lower span and a 20-mm upper span. All the bend tests were conducted at a crosshead speed of 0.05 mm/min in a $MoSi_2$-heating element vertical tube furnace. Specimen deflections were measured at the mid-point of the flexure bar by means of an alumina rod attached to a strain gage extensometer and were corrected for the fixture compliance. Results are shown in Table E5-1.

TABLE E5-1

| | Average Flexural Strength of Joints | |
|---|---|---|
| | Processing Temperature ° C. | |
| Test Temperature ° C. | 1350 | 1500 |
| ~25 | 104 MPa | 209 MPa |
| 1000 | 167 MPa | 310 MPa |

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A joined product of at least two bi-element carbide parts and a bond joint therebetween, comprising:

(a) said bond joint having a metal silicon phase, wherein silicon carbide is interspersed throughout said metal silicon phase.

2. The joined product as recited in claim 1, wherein the metal silicon phase is a metal silicon carbide ternary phase.

3. The joined product as recited in claim 1, wherein the metal silicon phase is a metal silicide.

4. The joined product as recited in claim 1, wherein the at least two bi-element carbide parts are selected from the group consisting of MC, $M_2C$, M4C and combinations thereof wherein M is a first element and C is carbon.

5. The joined product as recited in claim 4, wherein M is selected from the group consisting of IVB, VB, VIB of the periodic table of the elements, silicon, and boron.

6. The joined product as recited in claim 4, wherein M is selected from the group consisting of Ti, V, Mo, Hf, Zr, Nb, Ta, Cr, W, silicon, boron and combinations thereof.

7. The joined product as recited in claim 1, wherein at least one of said at least two bi-element carbide parts is a composite bi-element carbide.

* * * * *